United States Patent [19]
Houser et al.

[11] Patent Number: 6,020,401
[45] Date of Patent: Feb. 1, 2000

[54] ACRYLIC RESINS AS BINDERS FOR GRAVURE PRINTING INKS

[75] Inventors: Richard C. Houser; Charles G. Ruffner; Jacqueline K. Hahn, all of Jacksonville, Fla.; J. George Hayden, Awendaw; G. Frederick Hutter, Charleston, both of S.C.

[73] Assignee: Westvaco Corporation, New York, N.Y.

[21] Appl. No.: 08/946,718

[22] Filed: Oct. 8, 1997

Related U.S. Application Data

[62] Division of application No. 08/664,771, Jun. 17, 1996, abandoned.

[51] Int. Cl.⁷ .................................................. C09D 11/10
[52] U.S. Cl. .................... 523/161; 524/272; 526/318.45; 106/31.73
[58] Field of Search ..................................... 523/160, 161; 524/272; 526/318.45; 106/31.73

[56] References Cited

U.S. PATENT DOCUMENTS

| | | | |
|---|---|---|---|
| 5,098,479 | 3/1992 | Hutter | 524/272 |
| 5,166,041 | 11/1992 | Murofushi et al. | 430/339 |
| 5,518,848 | 5/1996 | Ito et al. | 430/96 |
| 5,631,309 | 5/1997 | Yanagi et al. | 523/160 |
| 5,650,473 | 7/1997 | Kimpton et al. | 526/318.6 |

*Primary Examiner*—Tae Yoon
*Attorney, Agent, or Firm*—Daniel B. Reece, IV; Terry B. McDaniel; Richard L. Schmalz

[57] ABSTRACT

This invention relates to acrylic resins. In particular, this invention relates to the use of acrylic resins as binders for formulating vehicles for solvent-based gravure and resinate gravure printing inks.

10 Claims, No Drawings

ACRYLIC RESINS AS BINDERS FOR GRAVURE PRINTING INKS

This application is a divisional application of our commonly assigned, U.S. patent application Ser. No. 08/664,771, filed Jun. 17, 1996, entitled "Acrylic Resins as Binders for Gravure Inks", now abandoned.

FIELD OF INVENTION

This invention relates to acrylic resins. In particular, this invention relates to the use of acrylic resins as binders for solvent-based gravure printing ink formulations.

BACKGROUND OF THE INVENTION

One of the traditional problems facing gravure ink formulators has been low solution viscosities. These low viscosities make it difficult to formulate inks having the desired pigment-to-binder ratios at press viscosity that are necessary for this type of printing.

The high acid values common in rosins may be lowered by reacting them with zinc oxide, calcium acetate, or similar compounds to produce metallic resinates. Metal resinates are widely used as binders in gravure printing due to their rapid solvent release and their ability to prevent some basic pigments from livering. These resinates are soluble in hydrocarbons, but not in alcohol.

However, one of the shortcomings of using metal resinates in gravure inks has been their low solution viscosities (a byproduct of their low molecular weights). These low viscosities lead to the same printing ink formulation problems referenced above.

A critical property of ink formulations that is directly linked to viscosity is dilutability. Viscosity is measured by the time required for an exact quantity of solution to flow by gravity through a specially sized apparatus. Dilutability is measured by the amount of solvent needed to reduce the viscosity of a given weight of resinate solution to a certain level. The typical specification calls for the volume of toluene needed to reduce 100 grams of resinate to 18 seconds as measured with a #2 Shell cup. While common dilutability values of commercial resinates are between 70 to 120 ml., ink makers would like dilutabilities higher than this in order to be able to achieve a desirable balance of solids, color strength, and viscosity in finished inks.

To solve these problems of viscosity and dilutability, ink makers traditionally have added small amounts of ethylcellulose (E/C) or ethylhydroxyethylcellulose (EHEC) to the ink as a dilution enhancer (the properties of which are discussed in U.S. Pat. No. 2,610,180). EHEC owes its thickening ability to three factors: (a) a very high molecular weight, (b) a rigid molecular structure, and (c) intermolecular association via hydrogen bonding of unetherified hydroxyl groups on the cellulose backbone. In this way E/C or EHEC can be used to produce a drastic reduction in resin solids at press viscosity (expressed in the industry as a "high dilution").

However, the use of E/C or EHEC may give rise to other problems, as described in Leach, R. H., *The Printing Ink Manual*, Van Nostrand Reinhold Co. Ltd., London, 1988. Very small amounts of these compounds can cause substantial reductions in the gloss of an ink. Moreover, these compounds are relatively expensive. Finally, E/C and EHEC have demonstrated resinate incompatibilities which seem to vary from batch to batch, and may manifest itself in phase separation of the ink upon standing.

Attempts have been made to avoid those problems by producing other binders which can be used as dilution enhancers. For example, U.S. Pat. No. 3,468,829 teaches the preparation of printing ink binders based on reaction products of: 1) natural resins, 2) other synthetic resins (for example, hydrocarbon resins having a bromine number of 5 to 80), and 3) calcium compounds (and, if appropriate, other compounds of group II of the periodic system). The patent also teaches reacting an unsaturated dicarboxylic acid (i.e., maleic anhydride) at the same time. However, this process has a disadvantage in that the resulting viscous products are virtually not utilizable as printing ink binders.

Other known binders are taught in U.S. Pat. Nos. 4,528,036 and 4,552,592. Here, the binders are based on the reaction products of: 1) natural resins, 2) a copolymer or a synthetic resin, and 3) calcium compounds. The resulting reaction products are reacted subsequently with acetic acid to form a salt of the corresponding resin. However, these solutions are of relatively low molecular weights and viscosities.

Yet another known binder is the product complex formed by reaction of a metal resinate and an amine-reactive polyamide as taught in U.S. Pat. No. 4,767,835. The amine-reactive polyamide, being a condensation polymer, is of comparatively low molecular weight.

U.S. Pat. No. 4,289,678 teaches an acrylic thickener for use in formulating gravure inks. This thickener, the reaction product of an addition polymerization reaction, has a molecular weight in the range of 100,000 to 2,000,000. This large molecular weight may cause incompatibility problems for ink formulators similar to those exhibited with E/C and EHEC.

Commonly assigned U.S. Pat. No. 5,098,479 teaches dilution enhancing aminoacrylate resin binders. However, as amine-containing monomers are employed in the production of these binders, they are primarily suitable for use in formulating zinc-containing metal resinate inks (i.e., they give little or no dilution enhancement in zinc-free resinates).

Despite the development of these, and other, thickeners E/C and EHEC remain the preferred viscosity extenders in the field. Therefore, it is an object of this invention to produce economical, dilution enhancing binders for use in formulating gravure printing inks.

Another object of this invention is to produce hydrocarbon-soluble binders which, when used to formulate gravure printing inks, enhance both the gloss and the color properties of the inks.

A further object of this invention is to produce gravure printing ink formulations with enhanced gloss and color characteristics.

SUMMARY OF THE INVENTION

These objects are achieved by the production and use of hydrocarbon-soluble resins which are suitable for employment as binders in formulating gravure printing inks. These binders are the solution polymerization reaction product of: 1) an alkyl or cycloalkyl ester of acrylic or methacrylic acid, 2) styrene or alkylated styrene, 3) a carboxyl-containing monomer, and where desired, 4) a difunctional ethylenically unsaturated monomer.

Studies have shown that gravure printing inks formulated with these relatively inexpensive binders exhibit dilution properties which are economically comparable to those displayed by inks formulated with E/C or EHEC (see Examples below). Moreover, inks formulated with these binders have superior gloss and color characteristics when compared to inks formulated with E/C or EHEC.

DESCRIPTION OF THE PREFERRED EMBODIMENT

The invention is the production and use of hydrocarbon-soluble resins as binders for gravure printing inks. These binders are the solution polymerization reaction products of:

(a) about 50.0% to about 99.0% by weight of a member selected from the group consisting of styrene, alkylated styrene, and combinations thereof;

(b) up to about 50.0% by weight of a member selected from the group consisting of alkyl esters of acrylic acid, alkyl esters of methacrylic acid, cycloalkyl esters of acrylic acid, cycloalkyl esters of methacrylic acid, and combinations thereof;

(c) about 0.2% to about 20.0% by weight of a carboxyl-containing monomer; and (d) up to about 2.0% of a difunctional ethylenically unsaturated monomer.

From about 50% to about 99% by weight of the reactants suitable for use in the solution polymerization reaction which produces the binder composition must be a member selected from the group consisting of styrene, alkylated styrene, and combinations thereof. The preferred range for these reactants is from about 80% to about 95%.

Up to 50% by weight of the reactants may be an alkyl or cycloalkyl ester of acrylic or methacrylic acid. The preferred range for these esters is from about 5% to about 20%. Suitable alkyl or cycloalkyl esters of acrylic or methacrylic acid include, but are not limited to, the following: butyl acrylate, butyl methacrylate, 2-ethylhexyl acrylate, ethyl acrylate, isobornyl methacrylate, isodecyl methacrylate, and combinations thereof.

From about 0.2% to about 20.0% by weight of the reactants may be a carboxyl-containing monomer or combination of monomers. The preferred range for these monomers is from about 1.0% to about 10.0%. Suitable carboxyl-containing monomers include, but are not limited to, the following: acrylic acid, methacrylic acid, itaconic acid, and combinations thereof.

Suitable difunctional ethylenically unsaturated monomers include, but are not limited to, the following: divinylbenzene, diethylene glycol diacrylate, tripropylene glycol diacrylate, allyl methacrylate, and combinations thereof.

While the solution polymerization reaction may be thermally driven, it is preferred to utilize a free-radical polymerization initiator. The type of free-radical polymerization initiator suitable for use in the reaction is known in the art to depend upon the desired temperature for the reaction. Typical initiators include, but are not limited to, the following: di-tert-butyl peroxide, t-butyl hydro peroxide, t-butyl peroxybenzoate, t-butyl peroctoate, azobisisobutyronitrile, benzoyl peroxide, and combinations thereof.

The present binders are the polymer reaction products of solution polymerization reactions. Suitable binders will have a number average molecular weight in the range from about 4,000 to about 80,000.

Solvents suitable for use in the reaction and in formulating the gravure inks include both aliphatic and aromatic hydrocarbons.

Where desired, the gravure printing ink formulation may include a resinate in addition to a pigment and the present binder composition. Suitable resinates for use in conjunction with the present binder may be prepared by metallization (i.e., the production of metal salts) of a member selected from the group of rosins including rosin, phenolated rosin, polymerized rosin, maleated rosin, fumarized rosin, and combinations thereof with a member selected from the group consisting of zinc, calcium, magnesium, and combinations thereof. The rosin may be derived from tall oil rosin, wood rosin, gum rosin, or combinations thereof.

As appreciated in the art, the exact components and properties of components desired for any given ink application can vary and, therefore, routine experimentation may be required to determine the optimal components and proportions, of components for a given application and desired properties.

The following examples are provided to further illustrate the present invention and are not to be construed as limiting the invention in any manner.

EXAMPLE 1

To a 5 L flask equipped with a stirrer and reflux condenser was charged 1480 g of toluene under a nitrogen blanket. Over the period of an hour the toluene was heated to 80° C. (This temperature level and the nitrogen blanket were maintained over the course of the reaction.) Subsequently, 98.8 g of benzoyl peroxide was added to the flask. Into a 3 L beaker were charged 1659.6 g of styrene, 198.4 g of butyl acrylate, and 127.6 g of acrylic acid. This monomer mixture was added via an addition pump to the flask over a period of 3 hours. The total charge was heated for an additional 3 hours, at which time 9.9 g of benzoyl peroxide was added. The total charge was heated for an additional hour to obtain a binder composition (BC #1) having a measured solids content of 59.1%, a Gardner-Holt viscosity of Z6-, and a capillary melting point of 132° C.

Comparison studies were made between this binder composition (BC#1) and Ethyl Cellulose (E/C) utilizing lithol rubine pigment base (a pigment concentrate commercially available from Sun Chemicals, Inc.). First, publication gravure printing inks letdown blends were produced by adding 25 g of JONREZ® MR-560 (JONREZ® MR-560 is a toluene-soluble calcium/zinc resinate solution used for gravure inks, commercially available from the Westvaco Corporation.), 16 g of the base, and 9 g of toluene to two glass jars. The jars were then agitated for 5 minutes on a RED DEVIL Shaker in order to thoroughly mix their contents. Second, to one jar was subsequently added 6% of an Ethyl Cellulose solution (Ethyl Cellulose at 7% non-volatiles in toluene) as a control. To the other jar was added 8% of BC#1 (which had previously been reduced to a solids content of about 40% via the addition of toluene). The jars were agitated for 5 minutes to mix their contents.

Both ink formulations were reduced to a viscosity of 18 seconds in a #2 Shell Cup at 25° C. by adding 35 mL of toluene to 50 g of the respective formulations. The inks were then drawn down and evaluated. The respective glosses were measured via a Pacific Scientific GLOSSGARD II 60° Glossmeter. The BC#1 formulation's gloss rating of 59.1 was clearly superior to the E/C formulation's rating of 46.3. Likewise, the color intensities of the formulations were measured as B values (C.I.E. system). Again, the BC#1 formulation's rating of 35.04 was superior to the E/C formulation's rating of 30.76.

EXAMPLE 2

To a 5 L flask equipped with a stirrer and reflux condenser was charged 518 g of toluene under a nitrogen blanket. Over the period of an hour the toluene was heated to 80° C. (This temperature level and the nitrogen blanket were maintained over the course of the reaction.) Subsequently, 31.2 g of benzoyl peroxide was added to the flask. Into a 3 L beaker were charged 580.9 g of styrene, 69.4 g of butyl acrylate, 44.7 g of acrylic acid, and 0.65 g of divinylbenzene (55%). This monomer mixture was added via an addition pump to the flask over a period of 3 hours. The total charge was heated for an additional 6 hours to obtain a binder composition (BC #2) having a measured solids content of 57.0%, a Gardner-Holt viscosity of Z6+, and a capillary melting point of 142° C.

Comparison studies were made between this binder composition (BC#2) #7 and Ethyl Cellulose (E/C) utilizing lithol rubine pigment base (an ink concentrate commercially available from Sun Chemicals, Inc.). First, publication gravure printing ink letdown blends were produced by adding 25 g of JONREZ® MR-560 (JONREZ® MR-560 is a toluene-soluble calcium/zinc resinate solution used for gravure inks, commercially available from the Westvaco Corporation.), 16 g of the base, and 9 g of toluene to two glass jars. The jars were then agitated for 5 minutes on a RED DEVIL Shaker in order to throughly mix their contents. Second, to one jar was subsequently added 6% of an Ethyl Cellulose solution (Ethyl Cellulose at 7% non-volatiles in toluene) as a control. To the other jar was added 8% of BC#2 (which had previously been reduced to a solids content of about 40% via the addition of toluene). The jars were agitated for 5 minutes to mix their contents.

Both ink formulations were reduced to a viscosity of 18 seconds in a #2 Shell Cup at 25° C. by adding 35 mL of toluene to 50 g of the respective formulations. The inks were then drawn down and evaluated. The respective glosses were measured via a Pacific Scientific GLOSSGARD II 60° Glossmeter. The BC#2 formulation's gloss rating of 62.5 was clearly superior to the E/C formulation's rating of 46.3. Likewise, the color intensities of the formulations were measured as b values (via the C.I.E. system). Again, the BC#2 formulation's rating of 31.52 was superior to the E/C formulation's rating of 30.76.

EXAMPLE 3

To a 3 L flask equipped with a stirrer and reflux condenser was charged 1243.2 g of toluene under a nitrogen blanket. Over the period of an hour the toluene was heated to 80° C. (This temperature level and the nitrogen blanket were maintained over the course of the reaction.) Subsequently, 74.9 g of benzoyl peroxide was added to the flask. Into a 1 L beaker were charged 1394.2 g of styrene, 166.6 g of butyl acrylate, 107.3 g of acrylic acid, and 1.6 g of divinylbenzene. This monomer mixture was added via an addition pump to the flask over a period of 3 hours. The total charge was heated for an additional 5 hours to obtain a binder composition (BC #3) having a measured solids content of 39.9%, a Gardner-Holt viscosity of Y+, and a capillary melting point of 144° C.

Comparison studies were made between this binder composition (BC#3) and Ethyl Cellulose (E/C) utilizing lithol rubine pigment base (a pigment concentrate commercially available from Sun Chemicals, Inc.). First, publication gravure printing ink letdown blends were produced by adding 25 g of JONREZ® MR-560 (JONREZ® MR-560 is a toluene-soluble calcium/zinc resinate solution used for gravure inks, commercially available from the Westvaco Corporation.), 16 g of the base, and 9 g of toluene to two glass jars. The jars were then agitated for 5 minutes on a RED DEVIL Shaker in order to throughly mix their contents. Second, to one jar was subsequently added 6% of an Ethyl Cellulose solution (Ethyl Cellulose at 7% non-volatiles in toluene) as a control. To the other jar was added 8% of BC#3 (which had previously been reduced to a solids content of about 40% via the addition of toluene). The jars were agitated for 5 minutes to mix their contents.

Both ink formulations were reduced to a viscosity of 18 seconds in a #2 Shell Cup at 25° C. by adding 35 mL of toluene to 50 g of the respective formulations. The inks were then drawndown and evaluated. The respective glosses were measured via a Pacific Scientific GLOSSGARD II 60° Glossmeter. The BC#3 formulation's gloss rating of 59.6 was clearly superior to the E/C formulation's rating of 45.0. Likewise, the color intensities of the formulations were measured as B values (C.I.E. system). Again, the BC#3 formulation's rating of 31.72 was superior to the E/C formulation's rating of 27.64.

EXAMPLE 4

To a 3 L flask equipped with a stirrer, reflux condenser, and two addition funnels was charged 600.1 g of dipropylene glycol monomethyl ether (DPM) under a nitrogen blanket. Over the period of an hour the DPM was heated to 160° C. (This temperature level and the nitrogen blanket were maintained over the course of the reaction.) Subsequently, 14.6 g of di-tert-butyl peroxide was added to the flask through the first addition funnel. Into a 1 L beaker were charged 489.4 g of vinyl toluene, 58.5 g of butyl acrylate, and 38.1 g of acrylic acid. This monomer mixture was added via the second addition funnel to the flask at a rate of 5 grams per minute. Afterwards, the total charge was heated for an additional 5 hours to obtain a binder composition (BC #4).

EXAMPLE 5

A binder composition was made using a continuous stirred tank reactor (CSTR) via the following procedure. The weight ratio of monomers in the feed was 83.5 parts of styrene, 6.5 parts of acrylic acid, 10.0 parts of butyl acrylate, and 0.1 parts of divinyl benzene. Based on the weight of the monomers, the feed had 2.5% of di-tert-butyl peroxide as an initiator and no chain transfer agent. The reaction solvent was isopropanol at 20% by weight of the total feed (25.6% by weight of monomers).

The feed rate for the run was 8.0 grams per minute, which gave a residence time in the CSTR of about 125 minutes. Process temperature in the CSTR averaged 159° C. on the run. Process temperature in the solvent flash vessel during the steady-state part of the run averaged 165° C. and ranged from 162 to 168° C. Pressure in the solvent flash vessel was atmospheric, and the resin pump was employed to discharge the resin continuously. About 3187 grams of a solid resin binder composition (BC #5) was produced having a number average molecular weight of about 6270 and a ring-and ball softening point of about 126.6° C.

EXAMPLE 6

A binder composition was made using a continuous stirred tank reactor (CSTR) via the following procedure. The weight ratio of monomers in the feed was 83.5 parts of styrene, 6.5 parts of acrylic acid, and 10.0 parts of isodecyl methacrylate. Based on the weight of the monomers, the feed had 2.5% of di-tert-butyl peroxide as an initiator and no chain transfer agent. The reaction solvent was isopropanol at 20% by weight of the total feed (25.6% by weight of monomers).

The feed rate for the run was such that the residence time in the CSTR of about 120 minutes. Process temperature in the CSTR averaged 158° C. on the run. Process temperature in the solvent flash vessel during the steady-state part of the run ranged from 178 to 190° C. Pressure in the solvent flash vessel was atmospheric, and the resin pump was employed to discharge the resin continuously. About 2286 grams of a solid resin binder composition (BC #6) was produced having a number average molecular weight of about 5300 and a ring-and ball softening point of about 121.5° C.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A gravure printing ink comprising pigment, a resinate, and a hydrocarbon-soluble pigment binder composition, wherein the binder composition comprises the solution polymerization reaction product of:
   (a) about 80.0% to about 95.0% by weight of a member selected from the group consisting of styrene, alkylated styrene, and combinations thereof;
   (b) about 5.0% to about 20.0% by weight of a member selected from the group consisting of alkyl esters of acrylic acid, alkyl esters of methacrylic acid, cycloalkyl esters of acrylic acid, cycloalkyl esters of methacrylic acid, and combinations thereof;
   (c) about 0.2% to about 15.0% by weight of a carboxyl-containing monomer; and
   (d) about 0.1% to about 2.0% by weight of a difunctional ethylenically unsaturated monomer.

2. The gravure printing ink of claim 1 wherein the resinate comprises the reaction product produced by reacting in a metallization reaction:
   (a) a rosin selected from the group consisting of rosin, phenolated rosin, polymerized rosin, maleated rosin, fumarized rosin, and combinations thereof, and
   (b) a member selected from the group consisting of zinc, calcium, magnesium, and combinations thereof.

3. The gravure printing ink of claim 2 wherein the rosin is derived from a member selected from the group consisting of tall oil rosin, gum rosin, wood rosin, and combinations thereof.

4. The gravure printing ink of claim 1 herein the hydrocarbon-soluble pigment binder composition comprises the solution polymerization reaction product of:
   (a) about 80.0% to about 95.0% by weight of a member selected from the group consisting of styrene, alkylated styrene, and combinations thereof;
   (b) about 5.0% to about 20.0% by weight of a member selected from the group consisting of alkyl esters of acrylic acid, alkyl esters of methacrylic acid, cycloalkyl esters of acrylic acid, cycloalkyl esters of methacrylic acid, and combinations thereof;
   (c) about 1.0% to about 10.0% by weight of a carboxyl-containing monomer; and
   (d) about 0.1% to about 1.0% by weight of a difunctional ethylenically unsaturated monomer.

5. The gravure printing ink of claim 1 wherein the alkyl or cycloalkyl ester of acrylic or methacrylic acid (b) is a member selected from the group consisting of butyl acrylate, butyl methacrylate, 2-ethylhexyl acrylate, ethyl acrylate, isobornyl methacrylate, isodecyl methacrylate, and combinations thereof.

6. The gravure printing ink of claim 1 wherein the carboxyl-containing monomer (c) is a member selected from the group consisting of acrylic acid, methacrylic acid, itaconic acid, and combinations thereof.

7. The gravure printing ink of claim 1 wherein the difunctional ethylenically unsaturated monomer (d) is a member selected from the group consisting of divinylbenzene, diethylene glycol diacrylate, tripropylene glycol diacrylate, allyl methacrylate, and combinations thereof.

8. The gravure printing ink of claim 1 wherein a catalytic amount of a free-radical polymerization initiator is used in the solution polymerization reaction.

9. The gravure printing ink of claim 8 wherein the free-radical polymerization initiator is a member selected from the group consisting of di-tert-butyl peroxide, t-butyl hydro peroxide, t-butyl peroxybenzoate, t-butyl peroctoate, azobisisobutyronitrile, benzoyl peroxide, and combinations thereof.

10. The gravure printing ink of claim 1 wherein the binder composition has a number average molecular weight in the range of about 4,000 to about 80,000.

* * * * *